US012584253B2

(12) United States Patent
Lee et al.

(10) Patent No.: US 12,584,253 B2
(45) Date of Patent: Mar. 24, 2026

(54) FILL COMPOSITION FOR REDUCING FILLING WEIGHT OF RESILIENT PRODUCTS

(71) Applicant: Target Brands, Inc., Minneapolis, MN (US)

(72) Inventors: Man Sang Manuel Lee, Shanghai (CN); Chen Tai Wong, Shanghai (CN); Yongbin Deng, Shanghai (CN); Dehui Huang, Shanghai (CN); Dongbing Sha, Shanghai (CN); Bin Liu, Shanghai (CN); Xiao Wang, Shanghai (CN); Bin Zhou, Shanghai (CN)

(73) Assignee: Target Brands, Inc., Minneapolis, MN (US)

(*) Notice: Subject to any disclaimer, the term of this patent is extended or adjusted under 35 U.S.C. 154(b) by 259 days.

(21) Appl. No.: 18/449,135

(22) Filed: Aug. 14, 2023

(65) Prior Publication Data

US 2025/0059689 A1 Feb. 20, 2025

(51) Int. Cl.

*D04H 1/435* (2012.01)
*A47G 9/10* (2006.01)

(Continued)

(52) U.S. Cl.

CPC ............... *D04H 1/435* (2013.01); *A47G 9/10* (2013.01); *D04H 1/43835* (2020.05); *B68G 2001/005* (2013.01)

(58) Field of Classification Search

CPC .. D04H 1/435; D04H 1/43835; A47G 9/0207; A47G 9/0253; A47G 9/10; B68G 1/00; B68G 2001/005

(Continued)

(56) References Cited

U.S. PATENT DOCUMENTS 3,772,137 A 11/1973 Tolliver
5,891,568 A 4/1999 Hartzong et al.

(Continued)

FOREIGN PATENT DOCUMENTS

CN 114032640 * 2/2022
WO 2015015214 A1 2/2015

(Continued)

OTHER PUBLICATIONS

Cafuta, Suitability of lyocell fiber for pillow fillings, Textile Research Journal, vol. 89, No. 8, pp. 3722-3743, 2019.

(Continued)

*Primary Examiner* — Camie S Thompson
(74) *Attorney, Agent, or Firm* — Amanda M. Prose; Westman, Champlin & Koehler, P.A.

(57) ABSTRACT

A filling material and method for reducing the amount of filling material required for filling a soft casing to a pre-selected specification, the filling material comprising a blend of polyester fibers having two or more different deniers and providing at least a 6% reduction in the amount of filling material required as compared to an alternative fill material consisting solely of polyester fibers of a single denier wherein the soft casing filled with the filling material meets pre-selected specifications comprising a pre-selected height measurement for the filled soft casing and is substantially the same in appearance as a soft casing filled with the alternative fill material consisting solely of polyester fibers of a single denier.

16 Claims, 3 Drawing Sheets

(51) Int. Cl.
*B68G 1/00* (2006.01)
*D04H 1/4382* (2012.01)

(58) Field of Classification Search
USPC ....... 428/359, 288, 294, 296, 360, 361, 362, 428/357, 372, 293, 394, 395
See application file for complete search history.

(56) References Cited

U.S. PATENT DOCUMENTS

| | | | | |
|---|---|---|---|---|
| 7,461,424 | B2 | 12/2008 | Lindell | |
| 9,462,902 | B1 | 10/2016 | Rukel | |
| 10,111,526 | B2 | 10/2018 | Davis et al. | |
| 10,863,836 | B2 | 12/2020 | Randall | |
| 11,369,220 | B2 | 6/2022 | Volle et al. | |
| 2006/0248651 | A1 | 11/2006 | Lazakis et al. | |
| 2018/0051402 | A1* | 2/2018 | Rossbach | D04H 1/43918 |

FOREIGN PATENT DOCUMENTS

| | | | |
|---|---|---|---|
| WO | 2016169223 | A1 | 10/2016 |
| WO | 2020188468 | A1 | 9/2020 |
| WO | 2022177969 | A1 | 8/2022 |

OTHER PUBLICATIONS

Chaiming et al., The Development of Pillow for Healthy People: a Pilot Study, International Journal of GEOMATE, vol. 19, Issue 72, pp. 28-34, 2020.
Radakrishnan, Recycled Polyester—Tool for Savings in the Use of Virgin Raw Material, Textile Science and Clothing Technology, Environmental Footprints of Recycled Polyester, 44 pages, 2019.
VNPolyfiber, 7D*64MM Siliconized Polyester Staple Fiber for Cushion and Pillow Filling, https://vnpolyfiger.com/product/7d64mm-siliconized-polyester-staple-fiber-for-cushion-and-pillow-filling, 11 pages, retrieved as early as May 9, 2023.

* cited by examiner

FILL COMPOSITION FOR REDUCING FILLING WEIGHT OF RESILIENT PRODUCTS

BACKGROUND

Pillows, cushions and other plush filled articles are frequently used to provide comfortable surfaces for a user. Pillows provide neck and head support during sleeping, back support when sitting and cushions for example can provide a seating surface or a sleeping surface for a human, or pet. These products are generally filled with various materials such as Goose feather, down, or polyester. Goose feather and down as used in fillings are expensive and require higher fill power to produce a product of selected puffiness and height.

Polyester fills are generally less expensive than down fills. Polyester is frequently provided for filling shells for products in a polyester batting and/or fluffy clusters of fibers.

Costs increase in production of these products based on the increased volume of materials needed to fill a casing for the product while maintaining desirable characteristics associated with the product, such as a fullness or puffiness of the product, and resilience and recovery when the product is used. Various materials have been produced to provide a product having a desired look and feel while reducing the costs associated with the filling. These include mixtures of different filling materials such as mixtures of down and polyester, or use of foam inserts, polyester batting sheets in layers, or other controlled shapes of material.

The discussion above is merely provided for general background information and is not intended to be used as an aid in determining the scope of the claimed subject matter. The claimed subject matter is not limited to implementations that solve any or all disadvantages noted in the background.

SUMMARY

An aspect of the present disclosure relates to a fill composition comprising a blend of fibers of the same composition or material, wherein the blend includes fibers of different sizes, such as fibers having a different denier. These fibers may be provided in the same in the same length, while having a different denier.

In some embodiments, the fill composition consists essentially of a mixture of 3 denier (D) and 7 denier (D) polyester fibers wherein the first fiber quantity is the 3D fibers at approximately 80 w % of a total weight of the fill composition and the second fiber quantity is the 7 D fibers at approximately 20 w % of a total weight of the fill composition and wherein the 3D and 7 D fibers are 64 mm fibers.

Another aspect of the present disclosure relates to a method of reducing the weight of a filling material of a product and filling the product with the fill material to produce a product that meets the same product specifications as set and met by higher weights of a standard filling material.

The filling material comprises a blend of polyester fibers having two or more different deniers and the filling material provides at least a 6% reduction in the amount of filling material required as compared to an alternative fill material consisting solely of polyester fibers of a single denier. When the soft casing is filled with the filling material, the product meets pre-selected specifications comprising a pre-selected height measurement for the filled soft casing and is substantially the same in appearance as a soft casing filled with the alternative fill material consisting solely of polyester fibers of a single denier.

In some embodiments, the filling material comprises a blend of 3 denier (3D) and 7 denier (7 D) rPET or PET fibers and the fibers have a length of approximately 64 mm. In some embodiments, the blend comprises a ratio of 3D:7 D fibers that is approximately 80:20.

The reduction in the amount of filling is a reduction in the filling weight of the filling material provided and wherein the reduction is approximately 6.67%.

The filling weight of the filling material is reduced as compared to the filling weight of the alternative fill material according to $F_{rv}$=R % ($F_s$*(1−R %)), wherein R is the percent reduction in weight realized by the new filling material. The soft casing filled with the filling material meets additional pre-selected specifications comprising one or more of hand-feel and resilience.

In one or more embodiments, the soft casing is a casing for a pillow, cushion, pet bed, or stuffed toy. The soft casing has set dimensions for producing a product according to the pre-selected specifications wherein the pre-selected specifications are the same for the filling material and alternative filling material but for the filling weight utilized to meet those pre-selected specifications.

Yet another aspect of the present disclosure relates to a method of filling a soft casing for producing a pillow with a selected fill material comprising a blend of a first quantity of fibers having a denier of 3D and a second quantity of fibers having a denier of 7 D and each of the first quantity and second quantities of fibers comprising fibers of a same average length. The fiber quantities are mixed and the soft casing defining dimensions of the filled pillow is filled with the fill material.

Determining a quantity of fill material for filling the soft casing is done according to one or more of a pre-selected parameter selected from the list comprising a fill material weight, a height of the filled pillow, a resilience of the filled pillow, and a hand-feel of the filled pillow.

In some embodiments, the determined quantity of selected fill material is at least 6% less than a quantity of fill material comprising only a first quantity or only a second quantity of fibers required to fill the soft casing according to at least two of the pre-selected parameters.

The selected fill material is configured to reduce the quantity of fill material required for filling the soft casing according to the pre-selected height of the filled pillow, the pre-selected resilience of the filled pillow, and the pre-selected hand-feel of the filled pillow.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
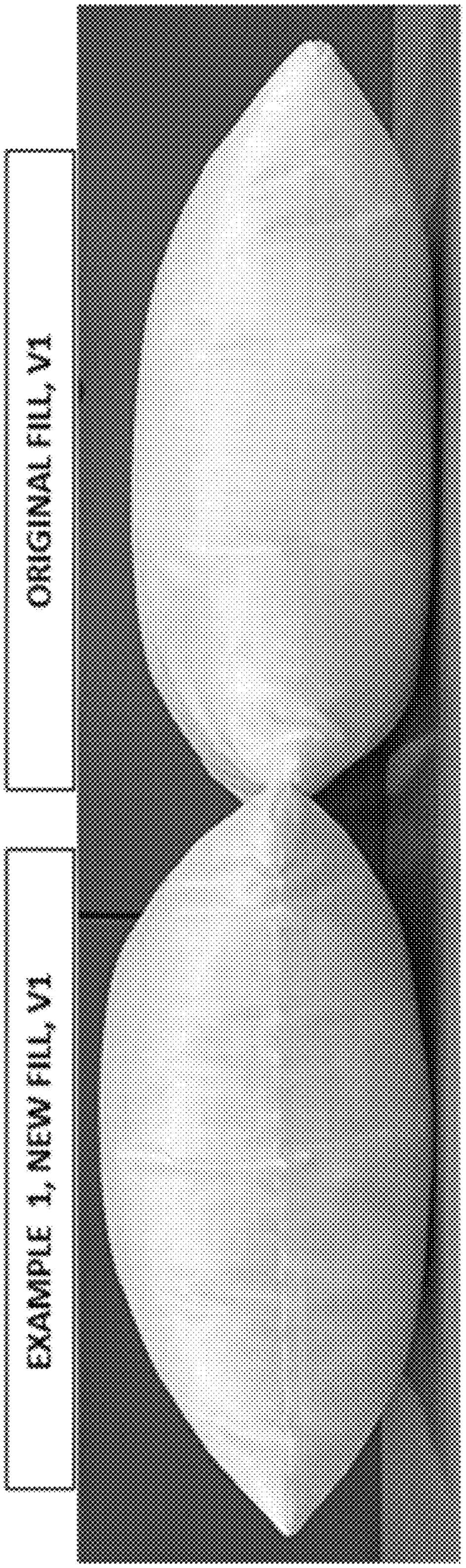
FIGS. 1-2 illustrate a comparison between a new fill composition according to the present disclosure and an original fill composition.

The present invention relates to a fill composition and method of reducing a quantity of fill composition used to produce a product. More specifically, the present invention relates to an improvement to achieve both better filling power and improved resilience while maintaining a hand feel matching that of current filling materials.

The fill composition and methods described herein relate to reducing the amount of filling material used to fill a product shell. The reduction in the amount of filling material used may relate to a reduction of the amount, by weight, of a same material filling. That is, the fill composition and methods relate to a blend of fibers of like composition but differing in denier and/or length. The reduction in amount can be understood as a reduction in the quantity, which may be measured by filling weight, of fibers required to fill a same product to the same specifications as compared to a fill material comprised of fibers of the same composition, and where in the fill material comprises fibers of a single, same denier and length.

For example, the fill composition described herein may be a synthetic fiber composition, and the composition includes a blend of different denier and/or length of the synthetic fibers. The amount of this fill composition needed to fill a product can be reduced by greater than 5%, greater than 6%, or greater than 10% or more as compared to a fill material needed to fill the product to the same specifications where the fill product is the same synthetic fiber, but the fibers are provided in one selected denier and length. The specifications may include a product volume which is determined by a manufacturer or designer of the product and the manufacturer or designer also sets the fill weight. The fill composition according to embodiments herein reduces the fill weight used while still meeting the pre-set fill volume for the product.

A product filled with the filling composition according to embodiments herein will have a same appearance as the product filled with a standard fill material, but the amount of fill composition use is less than the standard fill material used for the same product.

The fill composition described herein may be a polyester (PET) or recycled polyester (rPET) based material fiber and the fibers may generally be provided to the composition in a 3D, 7 D, and/or 15 D blend wherein "D" refers to "denier". The fibers may also have a length of approximately 32 mm, 51 mm, and/or 64 mm. The fill composition may comprise combinations of fibers with different denier and/or the same or different lengths. The terms "polyester." "PET." "recycled polyester" and "rPET" are used interchangeably herein.

The product may be a pillow such as bed pillows for sleeping or decorative pillows, cushions, bedding, stuffed toys, pet beds or the like. Embodiments of the fill composition are described in detail herein with respect to a pillow, however, any product having a shell for receiving a fluffy or puffy filling material is contemplated and within the scope of this disclosure.

Embodiments described in further detail herein relate to PET fibers and/or rPET fibers, however, other alternative natural or synthetic fibers and blends thereof are contemplated and within the scope of this disclosure.

What is meant by "denier" as used herein refers to the fineness of the fiber and/or the unit of measurement used to determine the fiber thickness of individual threads or filaments of the fill material.

In one or more embodiments, a fill composition comprises a mixture of PET or rPET fibers having at least one different property. The property may be thickness (denier) or length. In some embodiments, the thicknesses can include but are not limited to 3D, 7 D, and 15 D. In some embodiments, the length may range from about 30 mm to about 70 mm or more, and may include but is not limited to 32 mm, 51 mm, and 64 mm fibers.

In one or more embodiments, the fill composition comprises quantities of fibers having at least one different denier and all fibers provided in a same fiber length.

In one or more embodiments, the fill composition comprises fibers having a same denier and provided in a mixture of different fiber lengths.

In some embodiments, the fill composition comprises combinations of fibers having a same or different denier and fibers having a same or different length.

In embodiments herein, the fiber composition comprises two or more of a quantity of 3D, 7 D and 15 D fibers. The fibers are provided in a ratio of 3D:7 D:15 D fibers wherein the amount of each of the 3D, 7 D and 15 D fibers ranges from 0 to 99.

The filling composition according to one or more embodiments herein and methods for reducing the amount of filling composition needed or otherwise increasing the fill per associated with the product produce a produce that can be measuring by fill power ("low pressing") ("V1"), support (high pressing) ("V2"), and/or resilience (low pressing) ("V3") and Hand Feel ("subjective assessment").

"Original fill" as used below in connection with the Examples discussed herein is 100% 3D polyester or rPET fill composition.

Example 1

A pillow fill composition according to embodiments herein comprising rPET fibers at 64 mm length in a ratio of fibers 3D:7 D:15 D fibers of approximately 0.8:0.2:0 was filled in a cover having a 40 gsm non-woven construction with a specification fill weight of 430 grams to provide a pillow with an overall size of 18"×18". A second, same sample cover was filled with the original fill composition for direct comparison. See TABLE 1 below.

TABLE 1

Comparative Results, New Fill v. Original Fill.

| | New Fill [80:20 3D:7D] | Original Fill 100% 3D | Improvement | Improvement Rate |
|---|---|---|---|---|
| V1 | 192 | 180 | 12 | 6.67% |
| V2 | 47 | 45 | 2 | 4.44% |
| V3 | 156 | 152 | 4 | 2.63% |
| Hand Feel | <Approved> | <Approved> | Keep | Keep |

An image of the actual V1 Example 1 pillow produced by the same method as and compared directly to the V1 original fill pillow produced is provided as FIG. 1.

The fill composition for a textile shell according to one embodiment comprises a mixture of 3D and 7 D fibers where each of the 3D and 7 D fiber quantities have a length of 64 mm. The ratio of the 3D and 7 D fibers may be approximately 80:20. For example, the ratio of approximately 80:20 may be understood to include a ratio of 79:21 as an equivalent, which can more easily be calculated for large scale manufacture as 80:20. The composition may be used to fill a shell for a pillow. In this embodiment, the improvement rate as relates to V1 (fill power; low pressing), V2 (support; high pressing), and/or V3 (Resilience) (low pressing) and Hand Feel ("subjective assessment") is measured as directly compared to an original fill composition of fibers of one denier and at the same fiber length. See TABLE 1 above.

The standard weight of fiber fill may be considered, for example, the volume of a fill material of the same fiber denier and length that is otherwise required to fill the shell of a same size. That is, the fill composition described herein reduces the quantity (weight) of the fill required to fill the shell to the same volume as compared to a fill composition comprising only 3D, only 7 D or only 15 D fibers of fill.

In one or more embodiments described herein a Volume (V1)/weight reduction calculation can be conducted according to Equation 1:

$$F_{rv} = R\%(F_s * (1 - R\%)) \tag{1}$$

Where $F_{rv}$ is the reduced filling volume, R % is the reduction percentage in V1, which according to Example 1 is 6.67%, and $F_s$ is the specification or pre-set filling volume for the original fill.

An original filling weight of a product, such as a pillow, may generally be pre-determined by the designer or manufacturer of the pillow. For example, a manufacturer, designer or other technical designer has a specification set for filling weight with respect to an original filling. This weight will provide the pillow with a stiffness, a height and a hand feel selected by the manufacturer or designer and further corresponds directly to the shell or case which is to be filled and the volume selected for filling the same.

Embodiments herein refer to the original filling being 100% 3D rPET filling. As shown in Example 1, a filling composition of a mixture of 80% 3D+20% 7 D weight rPET, the volume of the product filled with a same weight fiber increases 6.67%. Volume is directly proportional to weight as relates to the filled pillow, so in one embodiment, decreasing the filling weight of the new filling composition by 6.67% produces a volume of filling (e.g., height of pillow) that is the same as the original sample and fill which uses 6.67% more filling that embodiments of the filling composition described herein.

Example 2

Figure 2:
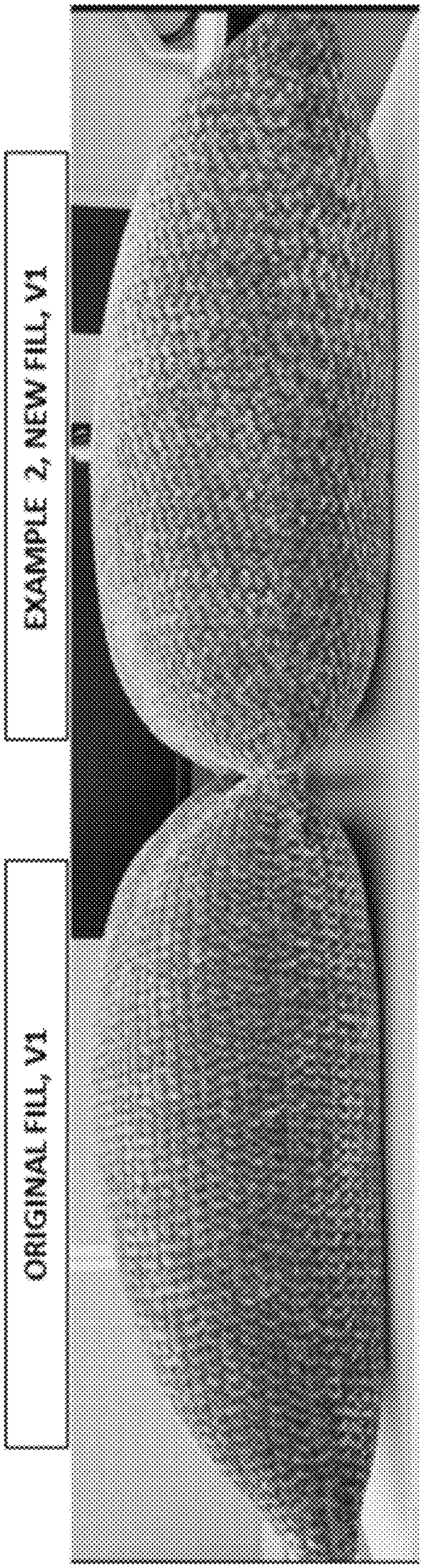

Referring to FIG. 2, a weight of another improved sample is reduced as the amount of filling needed is reduced from 800 g to 760 g. The filling new filling is a fill material composition according to embodiments herein including a blend of polyester fibers (rPET or PET) having a different denier and same length. In this non-limiting embodiment, the composition comprises 3D and 7 D rPET fibers in a ratio of 80:20 (3D:7 D) at 64 mm in length. The pillow of Example 2 saves 40 g of filling material as compared to the original fill, while maintaining the appearance and height of the pillow as substantially the same as a sample filled with 800 g of original fill. The reduction in the amount of filling composition needed was calculated according to Equation 1 [6.67% (800*(1−6.67%))=746.4 g] and optionally rounded to the next integer (e.g., 750) for ease in manufacturing to reduce the volume of material needed for filling the case by at least 40 grams. The same case or shell is filled by the same method, the only difference between the two pillows being the fill composition and the amount thereof.

The same methods and filling composition can be applied to a product with a different shell or case and specifications for stiffness and resilience, as well as volume.

When filling the shell or case, the fibers of the filling composition such as the 3D, 7 D and/or 15 D fibers are mixed before being blown into the shell or case.

Additional examples of material fill compositions according to one or more embodiments described herein are identified below in TABLE 2. The fiber denier ratios of TABLE 2 are applied to three different fiber lengths, 32 mm, 51 mm, 64 mm.

TABLE 2

| Standard No | Operation No | Point type | 3D | 7D | 15D |
|---|---|---|---|---|---|
| 13 | 1 | −1 | 0.6875 | 0.0875 | 0.225 |
| 9 | 2 | 0 | 0.675 | 0.175 | 0.15 |
| 2 | 5 | 1 | 0.5 | 0.2 | 0.3 |
| 4 | 6 | 1 | 0.7 | 0 | 0.3 |
| 3 | 7 | 1 | 1 | 0 | 0 |
| 5 | 8 | 2 | 0.5 | 0.35 | 0.15 |
| 14 | 2 | 0 | 0.675 | 0.175 | 0.15 |
| 11 | 9 | −1 | 0.5875 | 0.1875 | 0.225 |
| 1 | 10 | 1 | 0.5 | 0.5 | 0 |
| 7 | 11 | 2 | 0.75 | 0.25 | 0 |
| 12 | 12 | −1 | 0.8375 | 0.0875 | 0.075 |
| 15 | 2 | 0 | 0.675 | 0.175 | 0.15 |
| 8 | 13 | 2 | 0.6 | 0.1 | 0.3 |
| 6 | 14 | 2 | 0.85 | 0 | 0.15 |
| 10 | 15 | −1 | 0.5875 | 0.3375 | 0.075 |

Example 3

Figure 3:
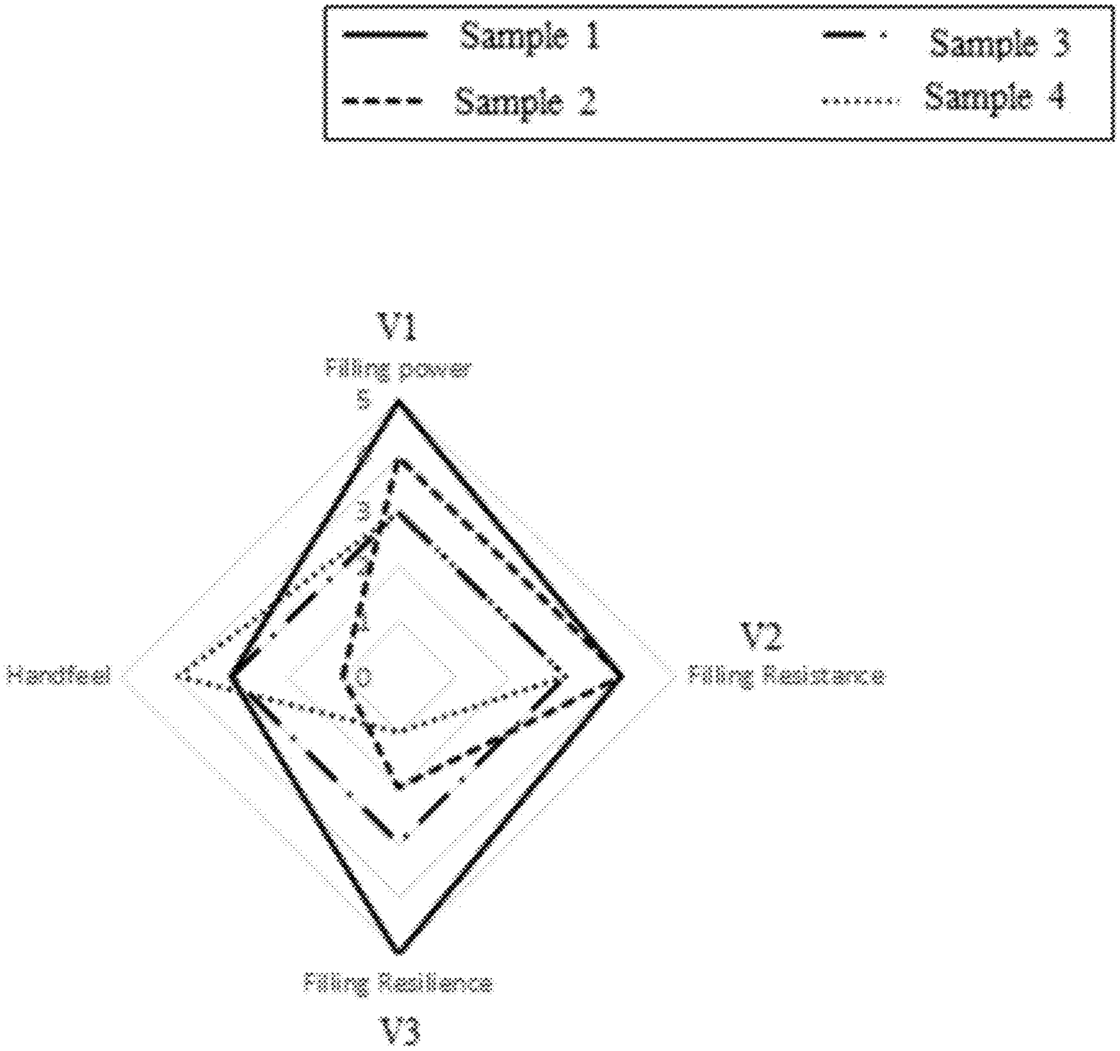
FIG. 3 illustrates results of a comparison between a fill composition according to the present disclosure and prior art fill compositions.

Referring to FIG. 3, four different fill materials were used to fill a same pillow shell to manufacturer specifications, with Sample 1 in FIG. 3 being the filling material according to embodiments herein and comprising a blend of 3D and 7 D polyester fibers in a fiber weight ratio of approximately 80:20. Samples 2, 3, and 4 are identified below in TABLE 3.

TABLE 3

| Sample ID | Sample Composition |
|---|---|
| 1 | Blend of 3D and 7D fibers having a length of 64 mm, in a weight ratio of 80:20; rPET |
| 2 | 100% 7D fill; 64 mm rPET fibers, (also evaluated same at 32 mm) |
| 3 | 100% 3D fill; 64 mm rPET fibers |
| 4 | 100% 3D fill; 51 mm rPET fibers |

Each sample was measured for four factors, including filling power of the material ("V1"), filling resistance ("V2"), filling resilience ("V3") and filling hand feel. Filling power affects the appearance of a product filled with the material as well the support offered by the filled product. Resistance and resilience both includes assessment of the material under normal pressure and resilience includes assessment of recovery of the material under both normal and vacuum pressure. Hand feel can relate to the slickness or texture of the material as compared to, for example, a down material.

As shown in FIG. 3, the blend of fibers of multiple sizes forms a filling that provides an increase in filling power thus using a reduced amount of filling to meet or exceed the values for resistance, resilience and hand feel as compared to prior art fill materials.

Compositions and methods described herein allow for products, including but not limited to pillows, to have the same fill power with a lower filling weight as compared to current polyester fillings (for example fillings with a single size of fibers) on the market. Advantages of the composition and methods herein further include a reduction in the cost of the goods as manufacturing costs are lowered with the reduction in raw material consumption (e.g., reducing filling weight).

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method for reducing the amount of a filling material required for filling a soft casing to a pre-selected specification:

providing a filling material comprising a blend of loose polyester fibers having two or more different deniers; and filling the soft casing with the amount of the filling material comprising the blend of loose fibers, wherein the filling material provides at least a 6% reduction in the amount of filling material required as compared to an alternative fill material consisting solely of polyester fibers of a single denier, wherein the soft casing filled with the filling material meets pre-selected specifications comprising a pre-selected height measurement for the filled soft casing and is substantially the same in appearance as a soft casing filled with the alternative fill material consisting solely of polyester fibers of a single denier, and wherein the filling material comprises a blend of 3 denier (3D) and 7 denier (7D) rPET or PET fibers and wherein the fibers have a length of approximately 64 mm.

2. The method of claim 1, wherein the blend comprises a ratio 3D:7 D fibers that is approximately 80:20.

3. The method of claim 1, wherein the reduction in the amount of filling is a reduction in the filling weight of the filling material provided and wherein the reduction is approximately 6.67%.

4. The method of claim 1, wherein the filling weight of the filling material, $F_{rv}$, is reduced as compared to the filling weight of the alternative fill material, $F_s$, according to:

$$F_{rv} = R\%(F_s * (1 - R\%))$$

wherein R is the percent reduction in weight realized by the new filling material.

5. The method of claim 1, wherein the soft casing filled with the filling material meets additional pre-selected specifications comprising one or more of hand-feel and resilience.

6. The method of claim 1, wherein the soft casing is a casing for a pillow, cushion, pet bed, or stuffed toy.

7. The method of claim 6, wherein the soft casing has set dimensions for producing a product according to the pre-selected specifications wherein the pre-selected specifications are the same for the filling material and alternative filling material but for the filling weight utilized to meet those pre-selected specifications.

8. A method of filling a soft casing for producing a pillow, the method comprising:

selecting a fill material comprising a blend of a first quantity of fibers having a denier of 3D and a second quantity of fibers having a denier of 7D and each of the first quantity and second quantities of fibers comprising fibers of a same average length of 64 mm;

mixing the first and second quantity of loose fibers; and filling a soft casing defining dimensions of the filled pillow with the fill material comprising the loose fibers.

9. The method of claim 8, and further comprising determining a quantity of fill material for filling the soft casing according to one or more of a pre-selected parameter selected from the list comprising a fill material weight, a height of the filled pillow, a resilience of the filled pillow, and a hand-feel of the filled pillow.

10. The method of claim 9, wherein the selected fill material is configured to reduce the quantity of fill material required for filling the soft casing according to the pre-selected height of the filled pillow, the pre-selected resilience of the filled pillow, and the pre-selected hand-feel of the filled pillow.

11. The method of claim 9, wherein the determined quantity of selected fill material is at least 6% less than a quantity of fill material comprising only a first quantity or only a second quantity of fibers required to fill the soft casing according to at least two of the pre-selected parameters.

12. A fill composition for a soft casing, the fill composition comprising:

a first fiber quantity, wherein the first fiber has a first denier and first length;

a second fiber quantity, wherein the second fiber has a second denier and second length, and wherein the first fiber quantity and second fiber quantity comprise polyester fibers, wherein the first denier of the first fiber is different than the second denier of the second fiber, and wherein the first fiber quantity and second fiber quantity are mixed together to form a loose fiber fill composition before or while filling the soft casing with the loose fiber fill composition wherein the fill composition consists essentially of a mixture of 3 denier (D) and 7 denier (D) polyester fibers wherein the first fiber quantity is the 3D fibers at approximately 80 w % of a total weight of the fill composition and the second fiber quantity is the 7D fibers at approximately 20 w % of a total weight of the fill composition and wherein the 3D and 7 D fibers are 64 mm fibers.

13. The fill composition of claim 12, wherein the first fiber quantity and the second fiber quantity are provided as a mixture wherein the first fiber quantity is more than 50% by weight of the fill composition and the second fiber quantity is less than 50% by weight of the fill composition.

14. The fill composition of claim 13, wherein the first length and second length are the same.

15. The fill composition of claim 12, and further comprising a third fiber quantity, wherein the third fiber has a third denier different from the first and second denier, and third length and wherein the third length is the same or different from the first length and second length.

16. The fill composition of claim 12, wherein the soft casing is a casing for a pillow.

* * * * *